US011473266B2

(12) United States Patent
Wright et al.

(10) Patent No.: US 11,473,266 B2
(45) Date of Patent: Oct. 18, 2022

(54) ARTICULATION JOINT FOR A MACHINE

(71) Applicant: Caterpillar Inc., Peoria, IL (US)

(72) Inventors: Jeremy Maron Allen Wright, Monticello, IL (US); Benjamin Charles Althoff, Macon, IL (US); Matthew Graham Burnette, Decatur, IL (US); Nikhil Sharma, Forsyth, IL (US); Vengadassalam Kalivarathan, Forsyth, IL (US); Matthew Allen, Normal, IL (US)

(73) Assignee: Caterpillar Inc., Peoria, IL (US)

( * ) Notice: Subject to any disclaimer, the term of this patent is extended or adjusted under 35 U.S.C. 154(b) by 1240 days.

(21) Appl. No.: 15/937,929

(22) Filed: Mar. 28, 2018

(65) Prior Publication Data

US 2019/0301133 A1   Oct. 3, 2019

(51) Int. Cl.
*E02F 9/00* (2006.01)
*F16C 33/74* (2006.01)
*E02F 3/76* (2006.01)
*E02F 9/08* (2006.01)

(52) U.S. Cl.
CPC .............. *E02F 9/006* (2013.01); *E02F 3/76* (2013.01); *F16C 33/74* (2013.01); *E02F 9/0841* (2013.01)

(58) Field of Classification Search
CPC . E02F 3/76; E02F 3/7636; E02F 3/764; E02F 3/80; E02F 3/815; E02F 9/006; E02F 9/0841; B62D 13/02; B62D 13/025; F16C 11/04; F16C 11/045; F16C 11/0671
See application file for complete search history.

(56) References Cited

U.S. PATENT DOCUMENTS

| | | | | | |
|---|---|---|---|---|---|
| 3,411,809 | A | * | 11/1968 | Houtz | B62D 53/02 180/265 |
| 3,778,174 | A | * | 12/1973 | Molby | F16C 11/0614 37/417 |
| 3,862,769 | A | * | 1/1975 | Bechman | B62D 53/02 280/400 |
| 4,192,523 | A | * | 3/1980 | Hausmann | F16C 11/0604 403/135 |
| 4,245,714 | A | * | 1/1981 | Kersey | E02F 9/0841 180/265 |

(Continued)

FOREIGN PATENT DOCUMENTS

CH    352242 A  *  2/1961
CN    206328735     7/2017
(Continued)

*Primary Examiner* — Jonathan P Masinick

(57) ABSTRACT

An articulation joint for a machine includes a first frame portion, a second frame portion, a hinge pin, a bearing member, a bushing member, and a washer assembly. The washer assembly includes a thrush washer and a housing. The thrust washer includes a plurality of washer segments. Each of the plurality of washer segments is adapted to be disposed co-planar and adjacent with respect to one another. The plurality of washer segments defines a central space adapted to receive the hinge pin therethrough. The housing includes a plurality of housing segments. Each of the plurality of housing segments is adapted to be disposed co-planar and adjacent with respect to one another. The plurality of housing segments defines an internal space adapted to enclose each of the washer segments therein.

20 Claims, 6 Drawing Sheets

(56) References Cited

U.S. PATENT DOCUMENTS

| | | | |
|---|---|---|---|
| 4,795,275 A | | 1/1989 | Titcomb et al. |
| 5,044,812 A | * | 9/1991 | Ardelt .................. E02F 9/006 |
| | | | 403/162 |
| 5,366,299 A | * | 11/1994 | Hughes ................ F16C 11/045 |
| | | | 384/571 |
| 5,490,682 A | | 2/1996 | Radosav et al. |
| 5,961,141 A | * | 10/1999 | Goel ...................... F16C 11/02 |
| | | | 403/162 |
| 6,071,033 A | * | 6/2000 | Neitzel ................ F16C 19/542 |
| | | | 403/150 |
| 6,783,129 B2 | * | 8/2004 | Akita .................... F16J 15/344 |
| | | | 277/402 |
| 7,273,317 B2 | | 9/2007 | Miyata et al. |
| 8,596,666 B1 | * | 12/2013 | Hansen ................ F16C 19/543 |
| | | | 403/150 |
| 8,869,910 B2 | * | 10/2014 | Greuel .................... E02F 3/844 |
| | | | 172/792 |
| 10,024,350 B2 | * | 7/2018 | Yanska ................ F16C 11/045 |
| 10,046,816 B2 | * | 8/2018 | Johannsen .............. F16C 17/04 |
| 10,436,249 B2 | * | 10/2019 | Hoelzl ................ F16C 33/1055 |
| 10,443,729 B2 | * | 10/2019 | Chapagain ........... F16J 15/3236 |
| 10,590,625 B2 | * | 3/2020 | Burnette ................ E02F 3/961 |
| 2006/0070758 A1 | * | 4/2006 | Ryan ..................... E02F 3/7654 |
| | | | 172/781 |
| 2006/0093246 A1 | * | 5/2006 | Akita .................... F16C 33/104 |
| | | | 384/279 |
| 2015/0292180 A1 | * | 10/2015 | Sester ...................... E02F 3/58 |
| | | | 37/399 |
| 2016/0032561 A1 | * | 2/2016 | Ginn ...................... F16C 35/02 |
| | | | 29/428 |
| 2021/0062908 A1 | * | 3/2021 | Harshman ................ E02F 9/12 |

FOREIGN PATENT DOCUMENTS

| | | | | |
|---|---|---|---|---|
| DE | 10247666 A1 | * | 4/2003 | ............ F16B 21/186 |
| DE | 102012210247 A1 | * | 12/2013 | ............... B62D 7/18 |
| FR | 2340466 A1 | * | 9/1977 | |
| FR | 2498273 A1 | * | 7/1982 | |
| JP | 02229327 A | * | 9/1990 | |
| JP | 09177761 A | * | 7/1997 | |
| JP | 4056658 | | 3/2008 | |
| JP | 2015092113 | | 5/2015 | |
| LV | 12774 | | 3/2002 | |

\* cited by examiner

ARTICULATION JOINT FOR A MACHINE

TECHNICAL FIELD

The present disclosure relates to an articulation joint for a machine. More particularly, the present disclosure relates to a washer assembly for the articulation joint associated with an articulating machine.

BACKGROUND

An articulating machine, such as a motor grader, includes an articulation joint in order to pivotally couple two sections of a frame with respect to one another. The articulation joint includes a bearing element to provide a bearing surface within the articulation joint during movement of the articulation joint. In a situation when the bearing element may be a sleeve bearing, a thrust washer may be employed in association with the bearing element.

In many situations, it may be difficult to provide access to the thrust washer due to an overall size and/or complex geometry of the articulation joint. For example, during maintenance of the articulation joint, access may be required to the thrust washer for a service check, lubrication, and/or replacement during worn out conditions of the thrust washer. In such a situation, the articulation joint may be considerably disassembled in order to provide access to the thrust washer.

The disassembly of the articulation joint may require removal of a hinge pin associated with the articulation joint and, thus, separation of the two sections of the frame of the articulating machine. This may result in the process being time and labor intensive, in turn, increasing machine downtime, machine productivity, and costs. Hence, there is a need for an improved articulation joint for such articulating machines.

U.S. Pat. No. 5,490,682 describes a split mechanical face seal including a first sealing element and a second sealing element. The first sealing element seals a primary ring against a shaft and rigidly positions the primary ring in axial, circumferential and radial directions. The second sealing element seals a mating ring against a housing and non-rigidly positions the mating ring in the axial direction while simultaneously providing an axial biasing force on the mating ring to provide contact of the primary ring and the mating ring.

SUMMARY OF THE DISCLOSURE

In an aspect of the present disclosure, an articulation joint for a machine is provided. The articulation joint includes a first frame portion defining a first bore therein. The articulation joint includes a second frame portion defining a second bore therein. The second bore is adapted to be aligned axially with respect to the first bore. The articulation joint includes a hinge pin disposed in each of the first bore and the second bore. The hinge pin is adapted to pivotally couple the first frame portion with respect to the second frame portion. The articulation joint includes a bearing member disposed in association with each of the hinge pin and the first frame portion. The bearing member is adapted to pivotally couple the hinge pin with respect to the first frame portion. The articulation joint also includes a bushing member disposed in association with the hinge pin and between each of the first frame portion and the second frame portion. The articulation joint further includes a washer assembly disposed in association with each of the hinge pin, the first frame portion, and the bushing member. The washer assembly includes a thrush washer disposed between the first frame portion and the bushing member. The thrust washer includes a plurality of washer segments. Each of the plurality of washer segments is adapted to be disposed co-planar and adjacent with respect to one another. The plurality of washer segments defines a central space adapted to receive the hinge pin therethrough. The washer assembly also includes a housing disposed in association with each of the bushing member and the first frame portion. The housing includes a plurality of housing segments. Each of the plurality of housing segments is adapted to be disposed co-planar and adjacent with respect to one another. The plurality of housing segments defines an internal space adapted to enclose each of the washer segments therein.

In another aspect of the present disclosure, a motor grader is provided. The motor grader includes a first frame portion defining a first bore therein. The first frame portion is adapted to support an implement thereon. The motor grader includes a second frame portion defining a second bore therein. The second bore is adapted to be aligned axially with respect to the first bore. The second frame portion is adapted to support a power source and an operator cabin thereon. The motor grader also includes a plurality of wheels rotatably coupled to each of the first frame portion and the second frame portion. The motor grader further includes an articulation joint provided in association with each of the first frame portion and the second frame portion. The articulation joint includes a hinge pin disposed in each of the first bore and the second bore. The hinge pin is adapted to pivotally couple the first frame portion with respect to the second frame portion. The articulation joint includes a bearing member disposed in association with each of the hinge pin and the first frame portion. The bearing member is adapted to pivotally couple the hinge pin with respect to the first frame portion. The articulation joint also includes a bushing member disposed in association with the hinge pin and between each of the first frame portion and the second frame portion. The articulation joint further includes a washer assembly disposed in association with each of the hinge pin, the first frame portion, and the bushing member. The washer assembly includes a thrush washer disposed between the first frame portion and the bushing member. The thrust washer includes a plurality of washer segments. Each of the plurality of washer segments is adapted to be disposed co-planar and adjacent with respect to one another. The plurality of washer segments defines a central space adapted to receive the hinge pin therethrough. The washer assembly also includes a housing disposed in association with each of the bushing member and the first frame portion. The housing includes a plurality of housing segments. Each of the plurality of housing segments is adapted to be disposed co-planar and adjacent with respect to one another. The plurality of housing segments defines an internal space adapted to enclose each of the washer segments therein.

In yet another aspect of the present disclosure, a method for servicing an articulation joint associated with a motor grader is provided. The articulation joint has a first frame portion, a second frame portion, a hinge pin, a bushing member, and a washer assembly. The washer assembly has a first washer segment, a second washer segment, a first housing segment, and a second housing segment. The method includes supporting each of the first frame portion and the second frame portion using a support member. The method includes decoupling at least one first fastening member associated with the first housing segment with respect to the first frame portion. The method includes decoupling at least one second fastening member associated with the second housing segment with respect to the first frame portion. The method includes removing the first housing segment with respect to the first frame portion. The method also includes removing the second housing segment with respect to the first frame portion. The method further includes providing service access to each of the first washer segment and the second washer segment.

Other features and aspects of this disclosure will be apparent from the following description and the accompanying drawings.

DETAILED DESCRIPTION

Figure 1:
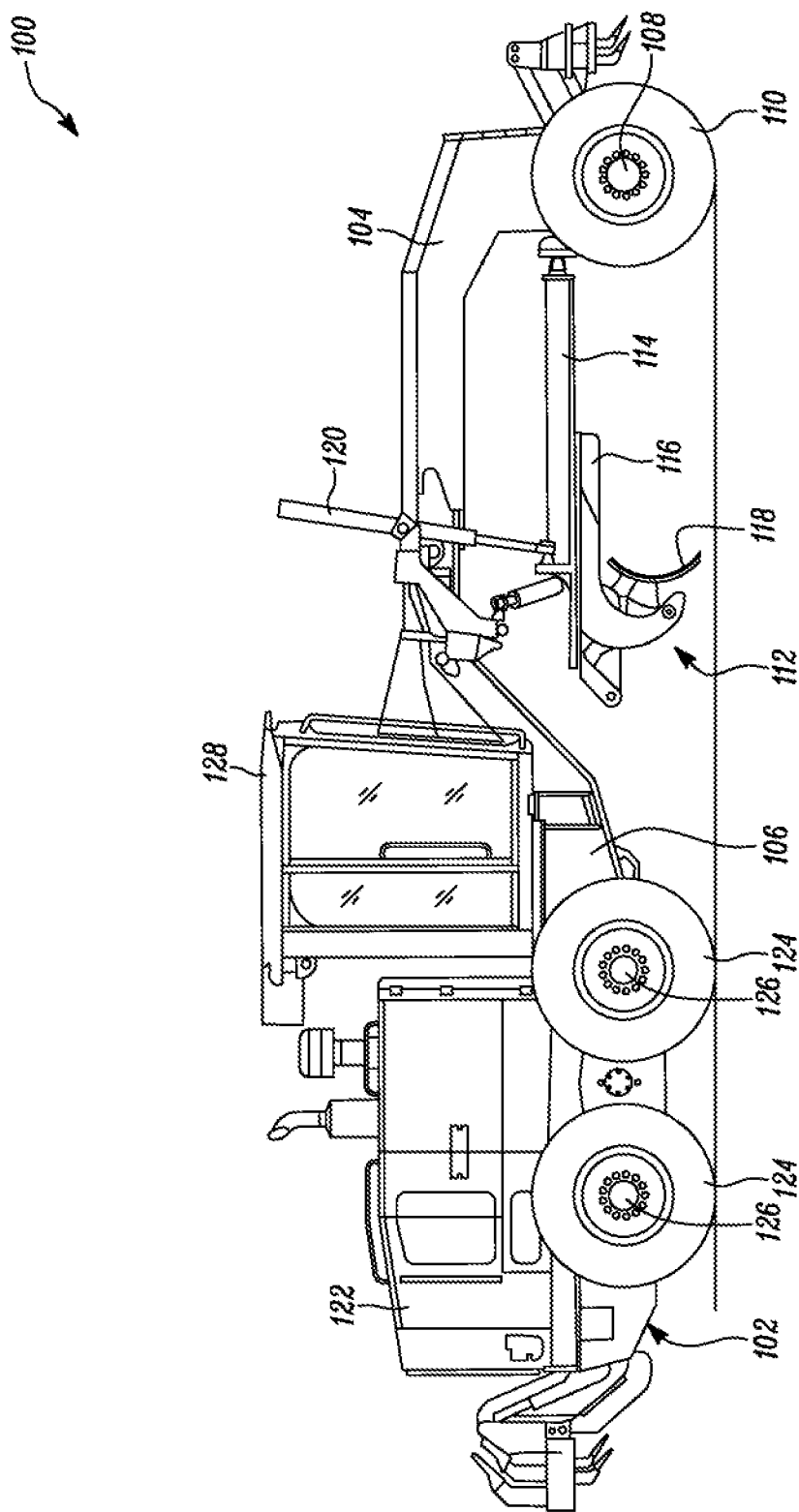
FIG. 1 is a side view of an exemplary machine, according to one embodiment of the present disclosure.

Wherever possible, the same reference numbers will be used throughout the drawings to refer to the same or the like parts. Referring to FIG. 1, an exemplary machine 100 is illustrated. More specifically, the machine 100 is a motor grader. The machine 100 is adapted to flatten uneven ground surface, such as during grading process prior to road construction, moving of snow, debris, and so on. In other embodiments, the machine 100 may be any other machine having an articulating frame, such as an articulated truck (not shown), employed in an industry including, but not limited to, construction, agriculture, waste management, material handling, and forestry.

The machine 100 includes a frame 102. The frame 102 includes a first frame portion 104 and a second frame portion 106. The first frame portion 104 will be hereinafter interchangeably referred to as the "first frame 104", and the second frame portion 106 will be hereinafter interchangeably referred to as the "second frame 106". The first frame 104 supports a steerable first axle 108. The first axle 108 supports a set of first wheels 110 and provides steering to the machine 100 on the ground. The first frame 104 also supports an implement, such as a blade assembly 112 of the machine 100. More specifically, the blade assembly 112 is supported by using a drawbar 114 and a circle 116 coupled to the first frame 104.

The blade assembly 112 includes a center blade 118 coupled to the circle 116. The blade assembly 112 also includes one or more hydraulic cylinders 120 to support the center blade 118. One end of the hydraulic cylinders 120 is coupled to the first frame 104. Another end of the hydraulic cylinders 120 is coupled to the circle 116. The hydraulic cylinders 120 alter a distance and/or an angle of the center blade 118 with respect to the ground. The machine 100 also includes the second frame 106 movably coupled to the first frame 104. More specifically, the second frame 106 is movably coupled to the first frame 104 via an articulation joint 202 (shown in FIG. 2) in order to provide articulation of the first frame 104 with respect to the second frame 106.

The second frame 106 includes an enclosure 122 provided thereon. The enclosure 122 houses a power source (not shown). The power source may be any power source known in the art, such as an internal combustion engine, a battery, a motor, and so on, or a combination thereof. The machine 100 includes a set of second wheels 124 coupled to the second frame 106 via a set of second axles 126. The second wheels 124 support and provide mobility to the machine 100 on the ground. The machine 100 includes an operator cabin 128 provided on the second frame 106. The operator cabin 128 includes various controls (not shown), such as a steering, a joystick, an operator console, an operator seat, levers, pedals, buttons, switches, knobs, and so on. The controls are adapted to control the machine 100 on the ground.

Figure 2:
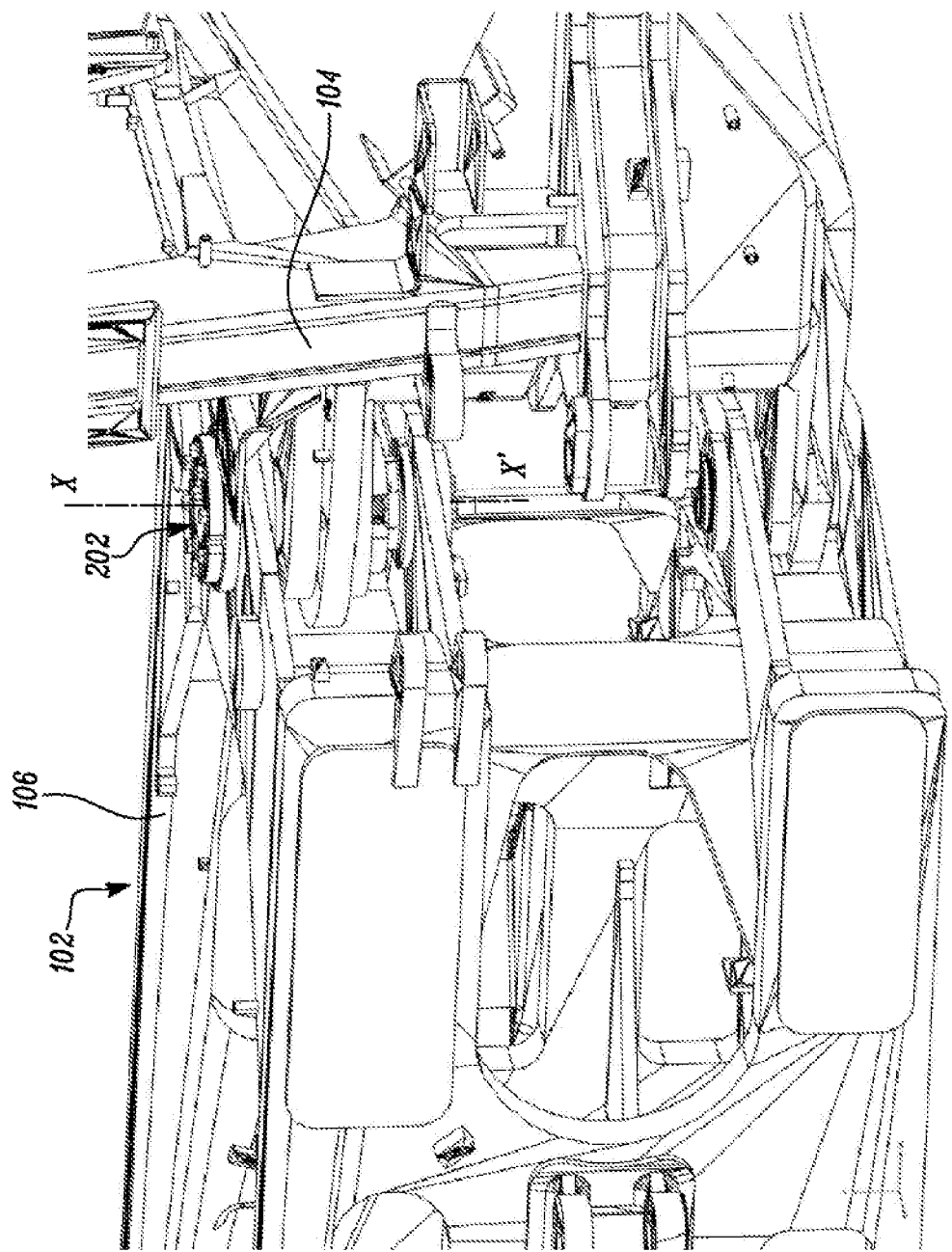
FIG. 2 is a perspective view of an articulation joint of the machine of FIG. 1, according to one embodiment of the present disclosure.

Referring to FIG. 2, a perspective view of the articulation joint 202 is illustrated. The articulation joint 202 will be hereinafter interchangeably referred as the "joint 202". The joint 202 defines an axis X-X' thereof. The joint 202 is adapted to pivotally couple the first frame 104 with respect to the second frame 106. Accordingly, the joint 202 is adapted to allow pivotal movement of the first frame 104 with respect to the second frame 106 about the axis X-X'. The joint 202 will be explained in more detail with reference to FIG. 3.

Figure 3:
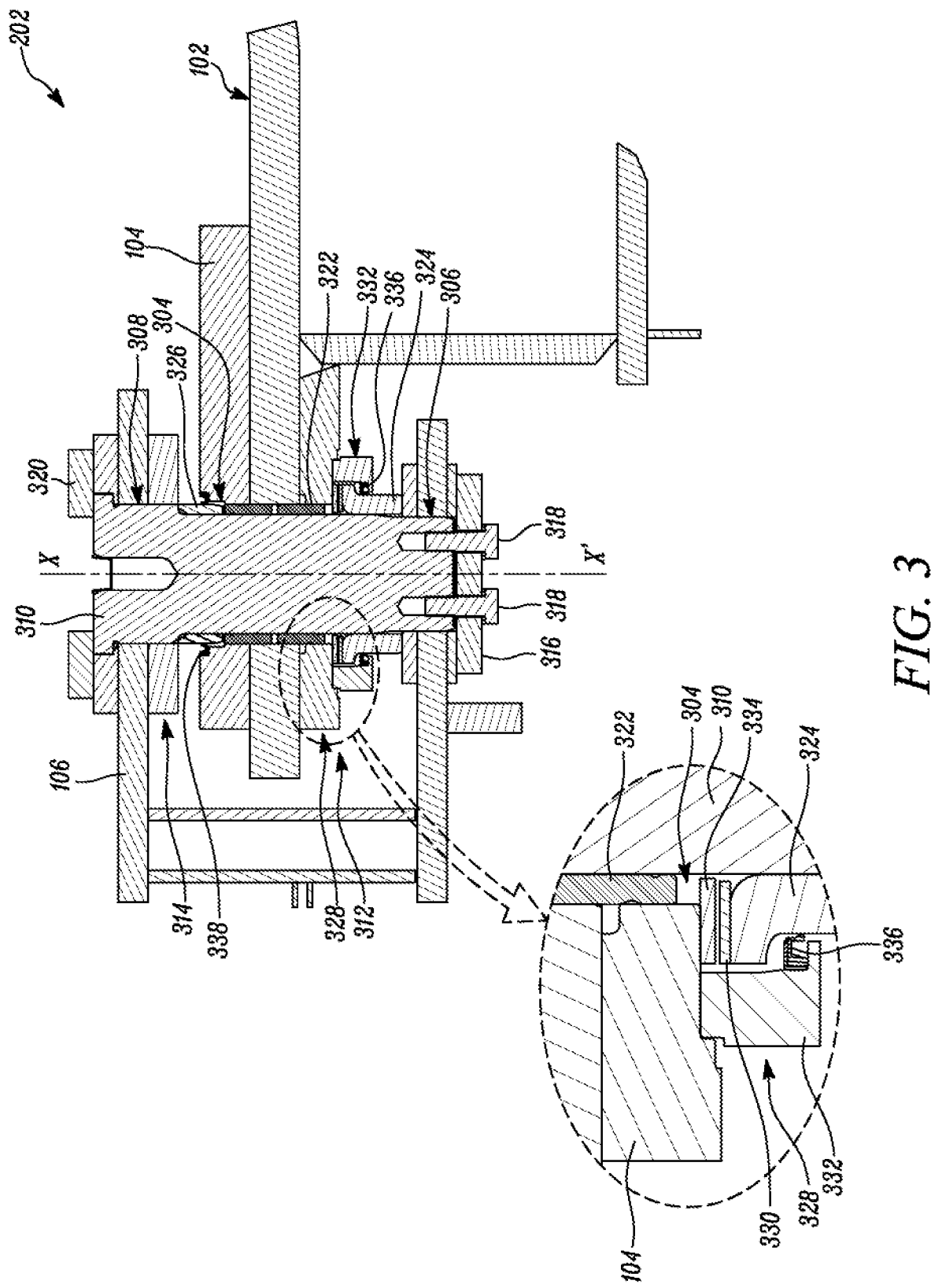
FIG. 3 is a cross-sectional view of the articulation joint of FIG. 2, according to one embodiment of the present disclosure.

Referring to FIG. 3, a cross-sectional view of the joint 202 is illustrated. The joint 202 includes a first bore 304 provided in the first frame 104. In the illustrated embodiment, the first frame 104 includes a single first bore. In other embodiments, the first frame 104 may include multiple first bores, based on an overall geometry of the first frame 104. The joint 202 also includes a plurality of second bores 306, 308 provided on the second frame 106. In the illustrated embodiment, the plurality of second bores 306, 308 include two second bores. In other embodiments, the second frame 106 may include single or multiple second bores, based on an overall geometry of the second frame 106. Each of the first bore 304 and each of the plurality of second bores 306, 308 are adapted to be axially aligned with respect to one another along the axis X-X'.

The joint 202 includes a hinge pin 310. The hinge pin 310 includes a substantially cylindrical configuration defining a first side 312 and a second side 314 thereof. The hinge pin 310 is disposed in each of the first bore 304 and each of the plurality of second bores 306, 308 and axially aligned with respect to the axis X-X'. The hinge pin 310 is adapted to pivotally couple the first frame 104 with respect to the second frame 106.

In the illustrated embodiment, the hinge pin 310 is removably coupled to the second frame 106. More specifically, the first side 312 of the hinge pin 310 is removably coupled to the second frame 106 adjacent to the second bore 306 using a first flange 316, and one or more fasteners 318. Also, the second side 314 of the hinge pin 310 is removably coupled to the second frame 106 adjacent to the second bore 308 using a second flange 320, and one or more fasteners (not shown). In other embodiments, the hinge pin 310 may be removably coupled to the second frame 106 using any coupling method known in the art. Also, in other embodiments, the hinge pin 310 may be alternatively coupled to the first frame 104, based on application requirements.

The joint 202 includes a bearing member 322. The bearing member 322 is disposed between the first frame 104 and the hinge pin 310 and axially aligned with respect to the axis X-X'. More specifically, the bearing member 322 is coupled to each of the first frame 104 and the hinge pin 310 using an interference fit therebetween. The bearing member 322 is adapted to pivotally couple the hinge pin 310 with respect to the first frame 104. The bearing member 322 may be any bearing element known in the art, such as a sleeve bearing.

The joint 202 includes a first bushing member 324. The first bushing member 324 includes a substantially hollow and cylindrical configuration. The first bushing member 324 is disposed between the first frame 104 and the second frame 106 and axially aligned with respect to the axis X-X'. Also, the first bushing member 324 is disposed surrounding the hinge pin 310 on the first side 312 of the hinge pin 310. The first bushing member 324 is adapted to transfer a vertical force of the first frame 104 to the second frame 106 therethrough.

The joint 202 includes a second bushing member 326. The second bushing member 326 includes a substantially hollow and cylindrical configuration. The second bushing member 326 is disposed between the first frame 104 and the second frame 106 and axially aligned with respect to the axis X-X'. Also, the second bushing member 326 is disposed surrounding the hinge pin 310 on the second side 314 of the hinge pin 310. The second bushing member 326 is adapted to limit clearance between the first frame 104 and the second frame 106 on the second side 314 of the hinge pin 310, and limit axial movement between the first frame 104 and the second frame 106 along the axis X-X'.

The joint 202 also includes a washer assembly 328. The washer assembly 328 is disposed in association with each the first frame 104 and the first bushing member 324. Also, the washer assembly 328 surrounds the hinge pin 310 on the first side 312 of the hinge pin 310. The washer assembly 328 includes a thrust washer 330 disposed between the first frame 104 and the first bushing member 324. The washer assembly 328 also includes a housing 332 disposed in association with each of the thrust washer 330, the first bushing member 324, and the first frame 104. The washer assembly 328 will be explained in more detail with reference to FIG. 4. The joint 202 also includes a retaining member 334 disposed between the thrust washer 330 and the first frame 104. The retaining member 334 includes a substantially circular configuration. The retaining member 334 is adapted to position and align the thrust washer 330 between the first frame 104 and the first bushing member 324.

The joint 202 further includes a first sealing member 336 and a second sealing member 338. The first sealing member 336 is disposed between the housing 332 and the first bushing member 324. The first sealing member 336 is adapted to limit flow of a lubricant between the housing 332 and the first bushing member 324. The second sealing member 338 is disposed between the first frame 104 and the second bushing member 326. The second sealing member 338 is adapted to limit flow of the lubricant between the first frame 104 and the second bushing member 326. Each of the first sealing member 336 and the second sealing member 338 may be any sealing element known in the art, such as an O-ring.

Figure 4:
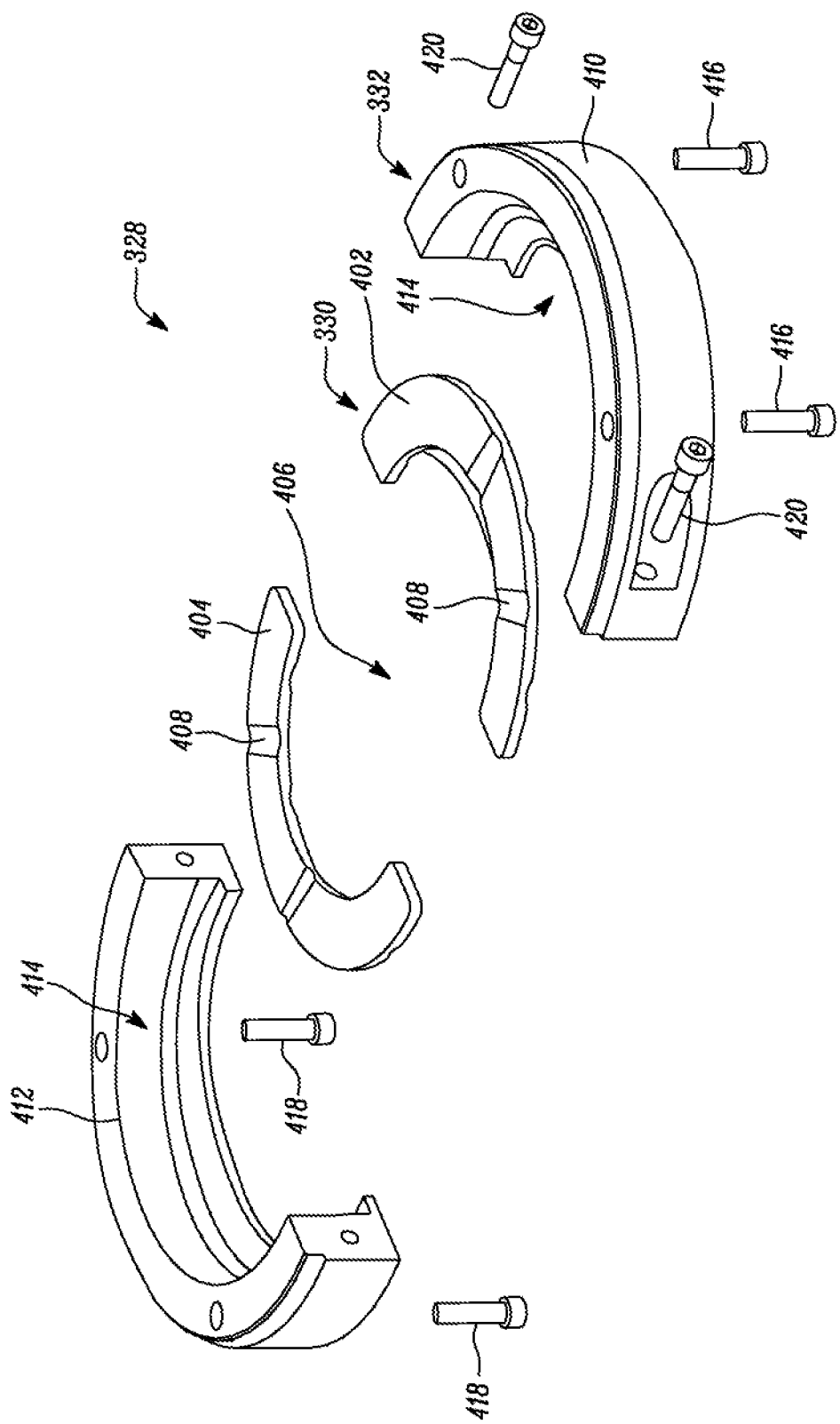
FIG. 4 is an exploded perspective view of a washer assembly of the articulation joint of FIG. 2, according to one embodiment of the present disclosure.

Referring to FIG. 4, a perspective exploded view of the washer assembly 328 is illustrated. The thrust washer 330 includes a plurality of washer segments, such as a first washer segment 402 and a second washer segment 404. In the illustrated embodiment, the thrust washer 330 includes two washer segments. In other embodiments, the thrust washer 330 may include multiple washer segments, based on application requirements. Each of the first washer segment 402 and the second washer segment 404 includes a substantially flat and curved configuration.

Each of the first washer segment 402 and the second washer segment 404 is adapted to be disposed co-planar and adjacent with respect to one another in a manner such that each of the first washer segment 402 and the second washer segment 404 defines a central space 406 therebetween. Each of the first washer segment 402 and the second washer segment 404 is disposed between the first frame 104 and the first bushing member 324 in a manner such that the central space 406 receives the hinge pin 310 therethrough.

Each of the first washer segment 402 and the second washer segment 404 is adapted to provide a bearing surface between the first frame 104 and the first bushing member 324. Also, each of the first washer segment 402 and the second washer segment 404 includes a number of lubrication grooves 408 provided thereon. Each of the lubrication grooves 408 is adapted to receive the lubricant, such as grease, and distribute the lubricant around each of the first washer segment 402 and the second washer segment 404. The lubricant may be provided during assembly of the washer assembly 328 and/or during operation of the machine 100 via one or more lubrication paths (not shown) associated with the joint 202.

The housing 332 includes a plurality of housing segments, such as a first housing segment 410 and a second housing segment 412. In the illustrated embodiment, the housing 332 includes two housing segments. In other embodiments, the housing 332 may include multiple housing segments, based on application requirements. Each of the first housing segment 410 and the second housing segment 412 includes a substantially stepped and curved configuration. Each of the first housing segment 410 and the second housing segment 412 is adapted to be disposed co-planar and adjacent with respect to one another in a manner such that each of the first housing segment 410 and the second housing segment 412 defines an internal space 414 therebetween.

Each of the first housing segment 410 and the second housing segment 412 is disposed in association with each of the thrust washer 330, the first frame 104, and the first bushing member 324 in a manner such that the internal space 414 encloses each of the first washer segment 402 and the second washer segment 404 therein. Also, the internal space 414 is adapted to receive the lubricant therein, such as during assembly of the washer assembly 328 and/or during operation of the machine 100. Additionally, the internal space 414 is also adapted to receive the first sealing member 336 therein.

The housing 332 is adapted to be removably coupled to the first frame 104 using one or more fasteners. More specifically, the first housing segment 410 is adapted to be removably coupled with respect to the first frame 104 using one or more first fastening members 416. Also, the second housing segment 412 is adapted to be removably coupled with respect to the first frame 104 using one or more second fastening members 418. Further, the first housing segment 410 is removably coupled with respect to the second housing segment 412 using one or more coupling members 420. Each of the first fastening member 416, the second fastening member 418, and the coupling member 420 may be any fastening element known in the art, such as a bolt, a screw, and so on.

Each of the first washer segment 402 and the second washer segment 404 may be made of any thrust bearing material known in the art, such as steel, or any other metal. Each of the first washer segment 402 and the second washer segment 404 may be manufactured using any manufacturing process known in the art, such as forming, forging, casting, machining, additive manufacturing, and so on. Also, each of the first housing segment 410 and the second housing segment 412 may be made of any material known in the art, such as metal, polymer, and so on. Further, each of the first housing segment 410 and the second housing segment 412 may be manufactured using any manufacturing process known in the art, such as forming, forging, casting, machining, additive manufacturing, and so on.

INDUSTRIAL APPLICABILITY

Figure 5:
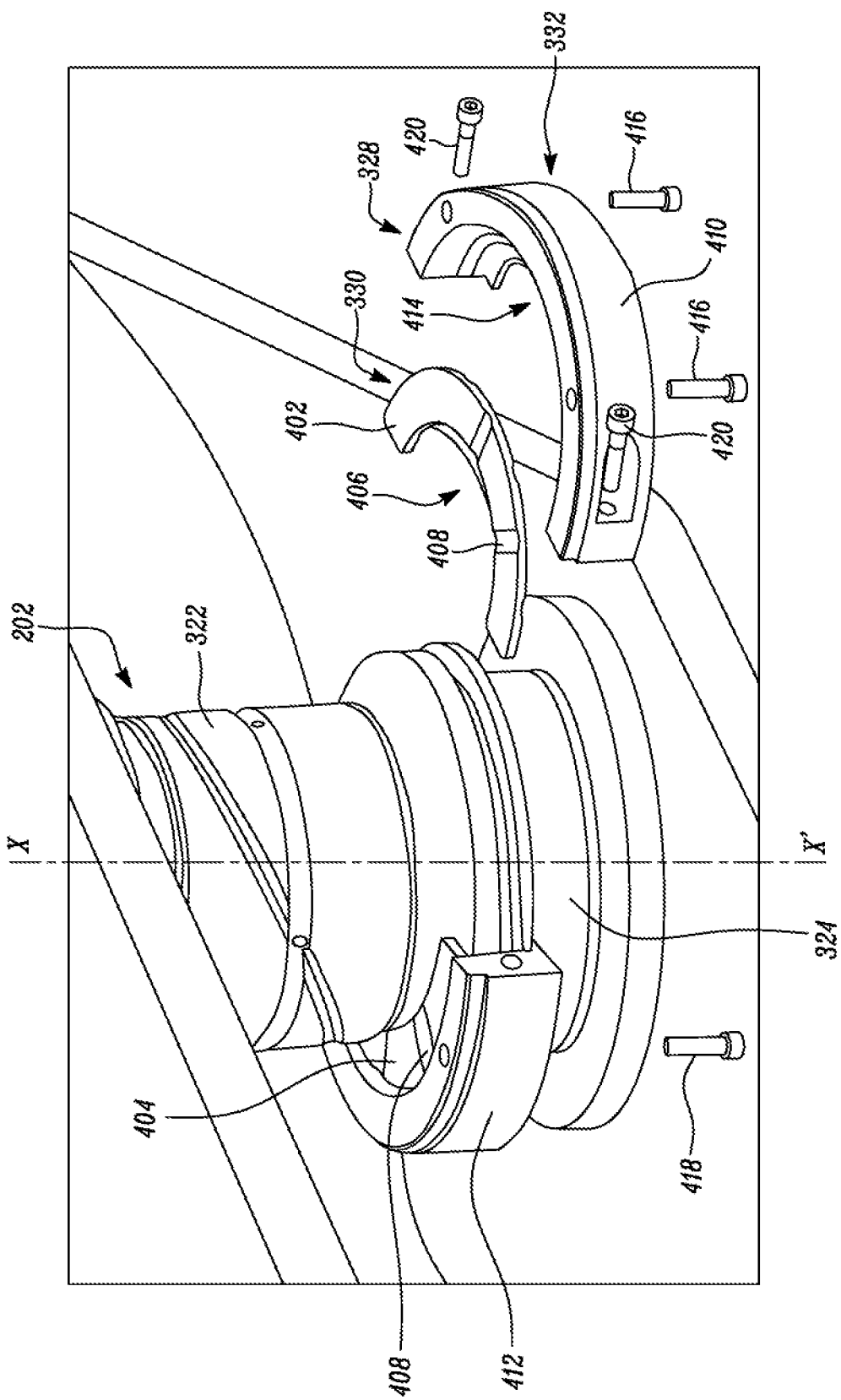
FIG. 5 is another partial exploded view of the washer assembly of FIG. 4 and the articulation joint of FIG. 2, according to one embodiment of the present disclosure.
Figure 6:
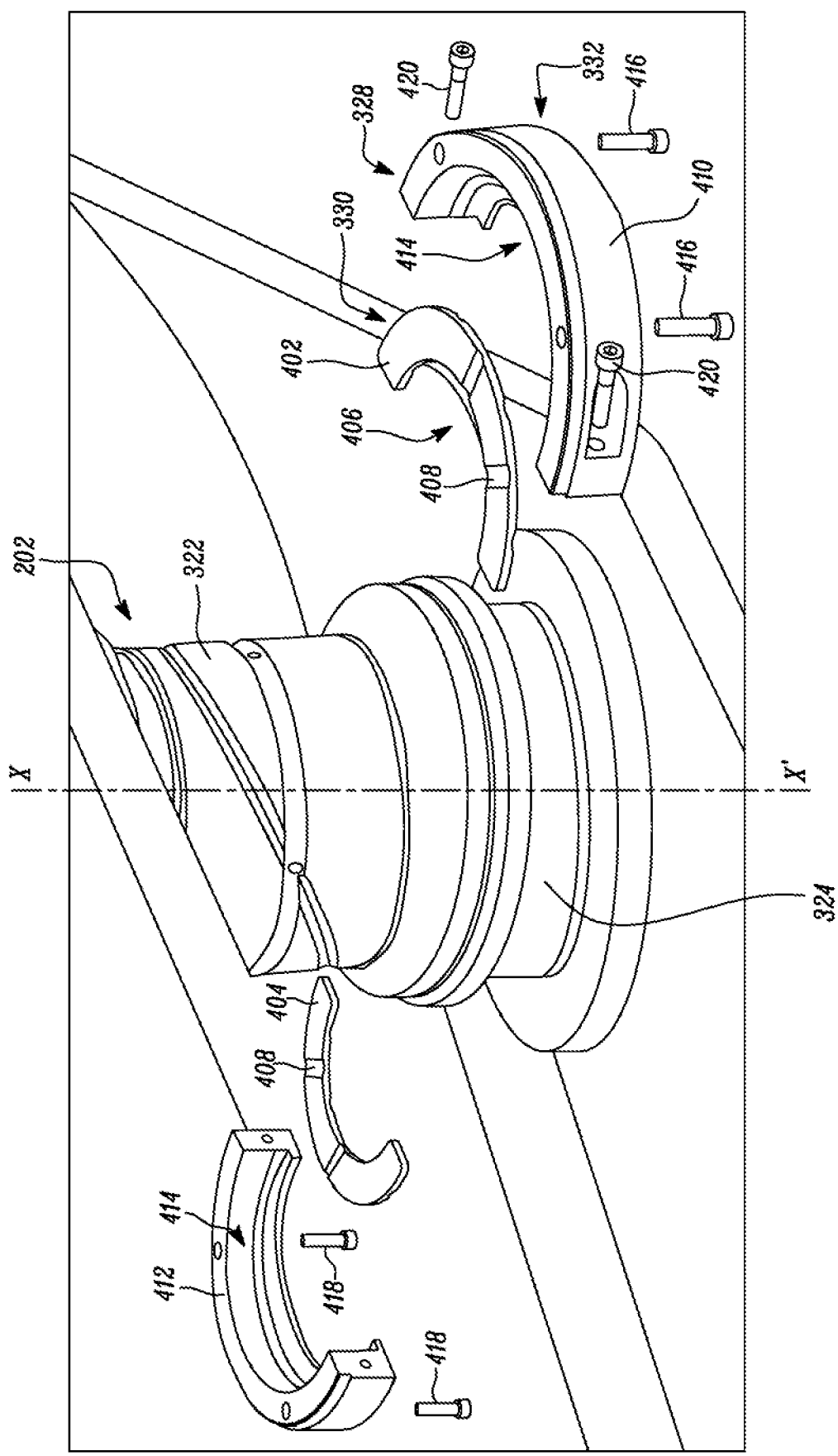
FIG. 6 is another exploded view of the washer assembly of FIG. 4 and the articulation joint of FIG. 2, according to one embodiment of the present disclosure.

The present disclosure relates to a method for servicing the joint 202. The method will now be explained with reference to FIGS. 5 and 6. FIGS. 5 and 6 illustrate different exploded perspective views of the washer assembly 328 with reference to the joint 202. It should be noted that some portions of the joint 202 are omitted for the purpose of clarity and explanation. During servicing of the joint 202, such as during a service inspection, maintenance, replacement, and so on, each of the first frame 104 and the second frame 106 is supported using a support member (not shown) respectively.

More specifically, each of the first frame 104 and the second frame 106 is supported independently with respect to one another in order to temporally limit loading of the second frame 106 on the first frame 104 and vice versa. The support member may be any support element known in the art, such as a hydraulic jack. Each of the one or more first fastening members 416 associated with the first housing segment 410 is then decoupled with respect to the first frame 104. Also, each of the one or more coupling members 420 is decoupled with respect to the second housing segment 412.

Accordingly, the first housing segment 410 is removed with respect to the first frame 104. As such, service access is provided to the first washer segment 402. Further, each of the one or more second fastening members 418 associated with the second housing segment 412 is decoupled with respect to the first frame 104. Accordingly, the second housing segment 412 is removed with respect to the first frame 104. As such, service access is provided to the second washer segment 404.

Further, during replacement of the thrust washer 330, each of the first washer segment 402 and the second washer segment 404 is removed with respect to the first bushing member 324. Each of a new first washer segment 402 and a new second washer segment 404 is then positioned with respect to the first bushing member 324. More specifically, each of the new first washer segment 402 and the new second washer segment 404 is disposed co-planar and adjacent with respect to one another. The first housing segment 410 is then positioned surrounding the new first washer segment 402. The first housing segment 410 is then coupled with respect to the first frame 104 using one or more first fastening members 416.

Also, the second housing segment 412 is then positioned surrounding the new second washer segment 404. The second housing segment 412 is then coupled with respect to the first frame 104 using one or more second fastening members 418. Additionally, the first housing segment 410 is coupled with respect to the second housing segment 412 using one or more coupling members 420. Each of the support members is then removed with respect to each of the first frame 104 and the second frame 106 respectively in order to complete the servicing and/or replacement of the thrust washer 330.

The washer assembly 328 provides a simple, effective, and cost-efficient method to provide a thrust bearing for the joint 202 while employing limited components. Further, the washer assembly 328 provides a simple method for servicing the joint 202 or replacing the thrust washer 330 without complete disassembly of the joint 202 and, thus, limiting separation of the first frame 104 with respect to the second frame 106. As a result, the thrust washer 330 provides a time and labor efficient method for servicing/replacement providing reduced service/replacement time, reduced labor effort, reduced machine downtime, increased productivity, and so on. The washer assembly 328 may be employed in any machine 100 with little or no modification to the existing system.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. An articulation joint for a machine, the articulation joint comprising:
   a first frame portion defining a first bore therein;
   a second frame portion defining a second bore therein, the second bore adapted to be aligned axially with respect to the first bore;
   a hinge pin disposed in each of the first bore and the second bore, the hinge pin adapted to pivotally couple the first frame portion with respect to the second frame portion;
   a bearing member disposed in association with each of the hinge pin and the first frame portion, the bearing member adapted to pivotally couple the hinge pin with respect to the first frame portion;
   a bushing member disposed in association with the hinge pin and between the first frame portion and the second frame portion; and
   a washer assembly disposed in association with each of the hinge pin, the first frame portion, and the bushing member, the washer assembly including:
      a thrust washer disposed between the first frame portion and the bushing member, the thrust washer including a plurality of independently removable washer segments, each of the plurality of washer segments adapted to be disposed co-planar and adjacent with respect to one another, the plurality of washer segments defining a central space adapted to receive the hinge pin therethrough; and
      a housing radially outwardly surrounding the bushing member, the housing including a plurality of housing segments, each of the plurality of housing segments adapted to be disposed co-planar and adjacent with respect to one another, the plurality of housing segments defining an internal space adapted to enclose each of the washer segments therein.

2. The articulation joint of claim 1, wherein each of the plurality of housing segments is coupled with respect to the first frame portion using at least one fastening member.

3. The articulation joint of claim 1, wherein each of the plurality of housing segments is coupled with respect to one another using at least one coupling member.

4. The articulation joint of claim 1, wherein:
the plurality of washer segments includes at least a first washer segment and a second washer segment, and
the plurality of housing segments includes at least a first housing segment and a second housing segment.

5. The articulation joint of claim 1, wherein each of the plurality of washer segments and each of the plurality of housing segments includes a substantially curved configuration.

6. The articulation joint of claim 1, wherein each of the plurality of washer segments includes at least one lubrication groove provided thereon.

7. The articulation joint of claim 1, wherein the internal space defined by the plurality of housing segments is adapted to receive a volume of a lubricant therein.

8. The articulation joint of claim 1 further including a sealing member disposed in the internal space defined by the plurality of housing segments and in association with the bushing member.

9. The articulation joint of claim 1, wherein the internal space, defined by the plurality of housing segments, is adapted to enclose a portion of the bushing member therein.

10. The articulation joint of claim 1, wherein each of the plurality of washer segments is a separate piece.

11. A motor grader comprising:
a first frame portion defining a first bore therein, the first frame portion adapted to support an implement thereon;
a second frame portion defining a second bore therein, the second bore adapted to be aligned axially with respect to the first bore, the second frame portion adapted to support a power source and an operator cabin thereon;
a plurality of wheels rotatably coupled to each of the first frame portion and the second frame portion; and
an articulation joint provided in association with each of the first frame portion and the second frame portion, the articulation joint including:
a hinge pin disposed in each of the first bore and the second bore, the hinge pin adapted to pivotally couple the first frame portion with respect to the second frame portion;
a bearing member disposed in association with each of the hinge pin and the first frame portion, the bearing member adapted to pivotally couple the hinge pin with respect to the first frame portion;
a bushing member disposed in association with the hinge pin and between the first frame portion and the second frame portion; and
a washer assembly disposed in association with each of the hinge pin, the first frame portion, and the bushing member, the washer assembly including:
a thrust washer disposed between the first frame portion and the bushing member, the thrust washer including a plurality of independently removable washer segments, each of the plurality of washer segments adapted to be disposed co-planar and adjacent with respect to one another, the plurality of washer segments defining a central space adapted to receive the hinge pin therethrough; and
a housing radially outwardly surrounding the bushing member, the housing including a plurality of housing segments, each of the plurality of housing segments adapted to be disposed co-planar and adjacent with respect to one another, the plurality of housing segments defining an internal space adapted to enclose each of the washer segments therein.

12. The motor grader of claim 11, wherein each of the plurality of housing segments is coupled with respect to the first frame portion using at least one fastening member.

13. The motor grader of claim 11, wherein each of the plurality of housing segments is coupled with respect to one another using at least one coupling member.

14. The motor grader of claim 11, wherein:
the plurality of washer segments includes at least a first washer segment and a second washer segment, and
the plurality of housing segments includes at least a first housing segment and a second housing segment.

15. The motor grader of claim 11, wherein each of the plurality of washer segments and each of the plurality of housing segments includes a substantially curved configuration.

16. The motor grader of claim 11, wherein each of the plurality of washer segments includes at least one lubrication groove provided thereon.

17. The motor grader of claim 11, wherein the internal space defined by the plurality of housing segments is adapted to receive a volume of a lubricant therein.

18. The motor grader of claim 11 further including a sealing member disposed in the internal space defined by the plurality of housing segments and in association with the bushing member.

19. The motor grader of claim 9, wherein the internal space, defined by the plurality of housing segments, is adapted to enclose a portion of the bushing member therein.

20. The motor grader of claim 9, wherein each of the plurality of washer segments is a separate piece.

* * * * *